(12) United States Patent
Spariosu et al.

(10) Patent No.: US 7,346,091 B2
(45) Date of Patent: Mar. 18, 2008

(54) HIGH ENERGY SOLID-STATE LASER WITH OFFSET PUMP AND EXTRACTION GEOMETRY

(75) Inventors: Kalin Spariosu, Thousand Oaks, CA (US); Alexander A. Betin, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 197 days.

(21) Appl. No.: 11/033,585

(22) Filed: Jan. 12, 2005

(65) Prior Publication Data

US 2008/0043800 A1 Feb. 21, 2008

(51) Int. Cl.
*H01S 3/091* (2006.01)
(52) U.S. Cl. .............................. 372/70; 372/69; 372/71
(58) Field of Classification Search .................... 372/70
See application file for complete search history.

(56) References Cited

U.S. PATENT DOCUMENTS

| | | | |
|---|---|---|---|
| 4,852,567 A * | 8/1989 | Sinofsky | 606/3 |
| 4,890,289 A * | 12/1989 | Basu et al. | 372/33 |
| 5,841,801 A * | 11/1998 | Suzuki | 372/23 |
| 5,852,626 A * | 12/1998 | Reed | 372/103 |
| 6,363,090 B1 * | 3/2002 | Wintner et al. | 372/21 |
| 6,434,177 B1 * | 8/2002 | Jurgensen | 372/43.01 |
| 2002/0105997 A1 * | 8/2002 | Zhang | 372/70 |
| 2005/0058173 A1 * | 3/2005 | Vetrovec | 372/66 |
| 2005/0074047 A1 * | 4/2005 | Boggy et al. | 372/69 |

FOREIGN PATENT DOCUMENTS

WO WO 92/03858 * 3/1992

* cited by examiner

*Primary Examiner*—Dung Nguyen
(74) *Attorney, Agent, or Firm*—Leonard A. Alkov

(57) ABSTRACT

A laser system and method. The inventive laser includes an annular gain medium; a source of pump energy; and an arrangement for concentrating energy from the source on the gain medium. In a more specific implementation, a mechanism is included for rotating the gain medium to effect extraction of pump energy and cooling. In the illustrative embodiment, the pump source is a diode array. Energy from the array is coupled to the medium via an array of optical fibers. The outputs of the fibers are input to a concentrator that directs the pump energy onto a pump region of the medium. In the best mode, plural disks of gain media are arranged in an offset manner to provide a single resonator architecture. First and second mirrors are added to complete the resonator. In accordance with the inventive teachings, a method for pumping and cooling a laser is taught. In the illustrative embodiment, the inventive method includes the steps of providing a gain medium; pumping energy into a region of the gain medium; moving the medium; extracting energy from the region of the medium; and cooling region of the medium.

16 Claims, 8 Drawing Sheets

FIG. 1
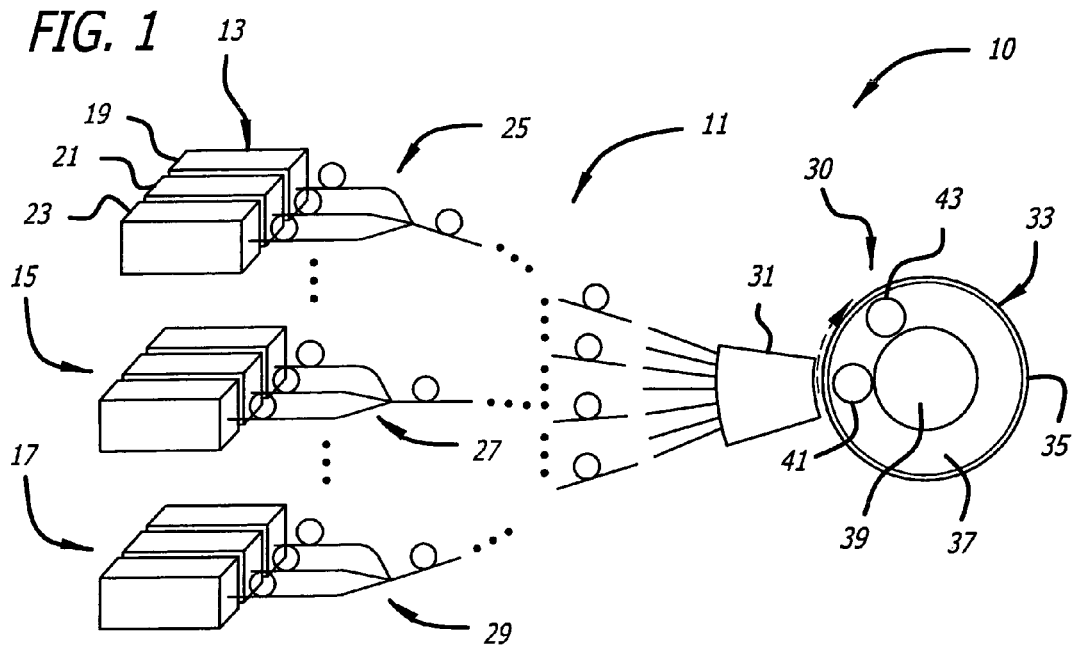
FIG. 1a
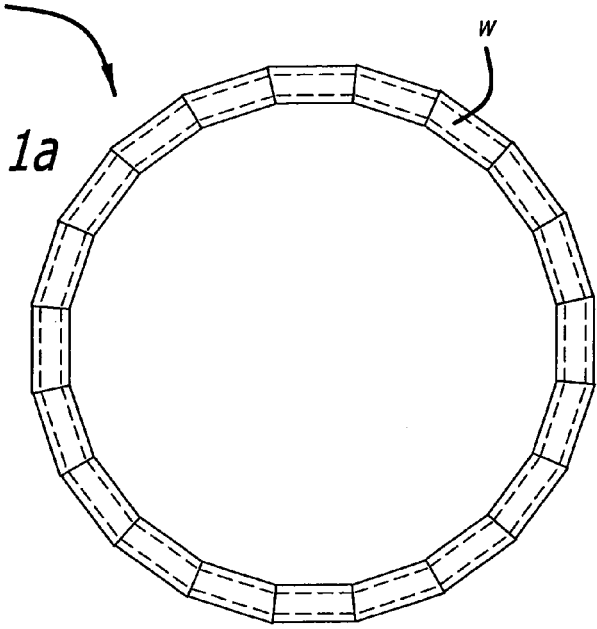
FIG. 1b
FIG. 1c
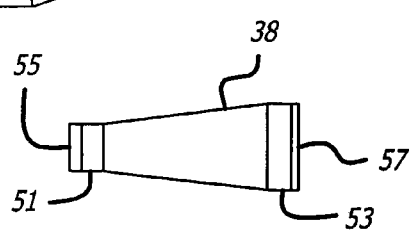

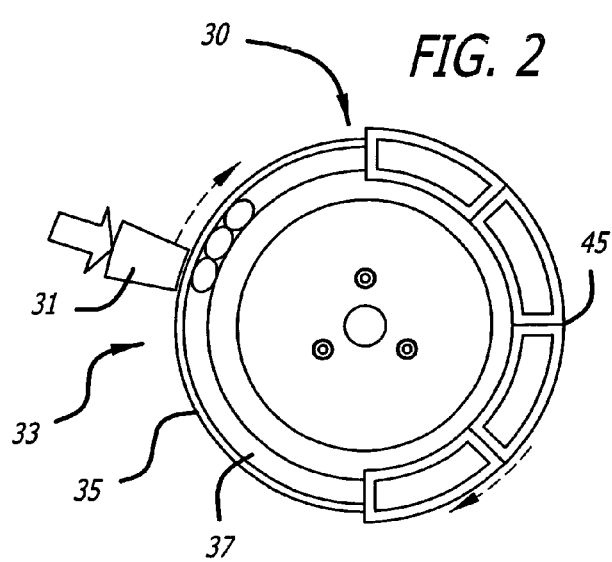
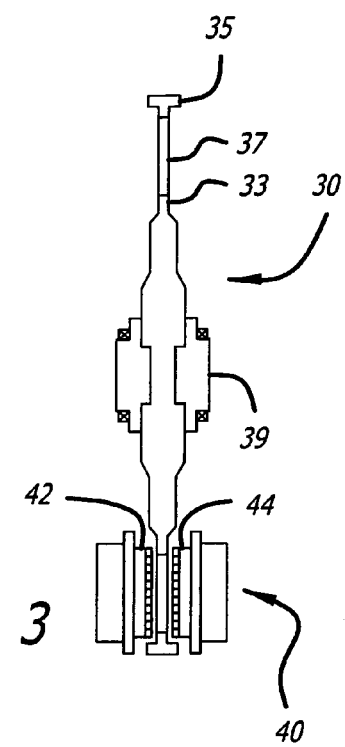
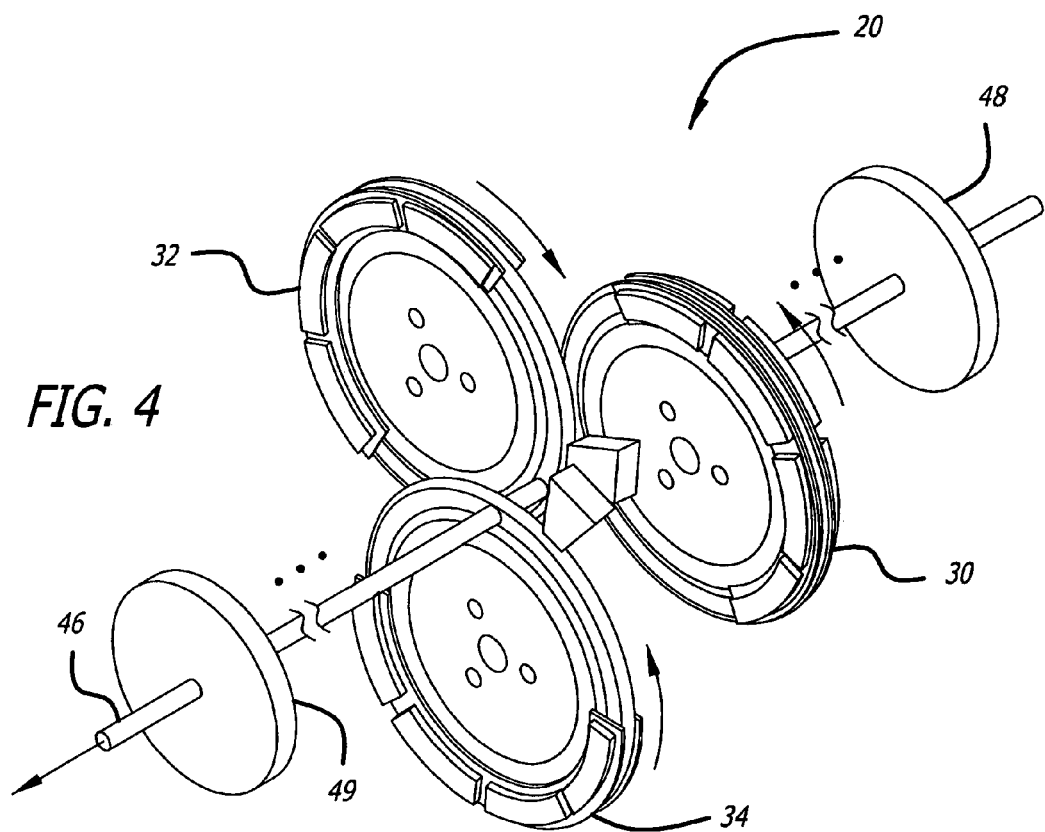

HIGH ENERGY SOLID-STATE LASER WITH OFFSET PUMP AND EXTRACTION GEOMETRY

BACKGROUND OF THE INVENTION

1. Field of the Invention

The present invention relates to lasers. More specifically, the present invention relates to high energy lasers.

2. Description of the Related Art

High energy lasers are currently being evaluated for a variety of military and industrial applications. The implementation of a high energy weapon-class laser system is currently-limited to large platforms only due to the relatively low power per weight ratio numbers in the present approaches.

Prior approaches for weapons class lasers include chemical and gas lasers, which have already demonstrated weapon level power. Other diode-pumped solid-state bulk and fiber-based approaches also have been proposed. The conventional chemical laser is a large and highly complex system. In addition, the chemical handling requirement makes this an extremely cumbersome and undesirable approach. The relatively clean diode-pumped solid-state laser approach is much more desirable.

However, diode-pumped solid-state lasers using bulk active media have problems such as high beam distortion as the beam propagates through the amplifier chain. Compensation for this distortion currently requires active (deformable mirror) or passive (such as non-linear phase conjugation) techniques. In addition, the gain elements for bulk diode-pumped solid-state lasers are currently comprised of complex, expensive composite slabs, which are prone to damage. In addition, the master oscillator-power amplifier (MOPA) approach, which is typically, used to improve the beam quality of bulk solid-state lasers, limits the ultimate optical (and, therefore, the overall) conversion efficiency, which results in increased power and waste heat extraction real-estate requirements.

Fiber lasers have inherently high efficiencies because they operate at very high laser beam intensities and allow for 100% pump power absorption and can be cooled efficiently due to their inherently high surface to volume ratio relative to traditional bulk solid-state lasers. Fiber lasers, however, are limited with respect to the maximum power that they can operate at due to intensity damage threshold limits. Fiber lasers, therefore, typically require coherent phasing of multiple fiber oscillators to achieve high power levels. This adds a number of problems and associated complexities. Principal of which is alignment, sensitivity to vibration, and lack of a reliable and robust approach for coherent combining of multiple individual laser beams. Another problem is the requirement of complex beam combining/shaping optics to form one compact output beam out of an array of multiple individual beams. Production of a high quality output beam then requires scaling, dissipation of heat and some approach for dealing with the high concentration of energy in a small volume. This leads to increased system complexity and associated high costs.

Hence, a need exists in the art for a relatively unsophisticated system or method for substantially increasing the output power, efficiency, and beam quality of high-energy lasers.

SUMMARY OF THE INVENTION

The need in the art is addressed by the system and method of the present invention. In the illustrative embodiment, the inventive system comprises an annular gain medium; a source of pump energy; and an arrangement for concentrating energy from the source on the gain medium.

In a more specific implementation, a mechanism is included for rotating the gain medium to effect extraction of pump energy and cooling. In the illustrative embodiment, the pump source is a diode array. Energy from the array is coupled to the medium via an array of optical fibers. The outputs of the fibers are input to a concentrator that directs the pump energy onto a pump region of the medium.

In the best mode, plural disks of gain media are arranged in an offset manner to provide a single resonator architecture. First and second outcoupler mirrors are added to complete the resonator.

In accordance with the inventive teachings, a method for pumping and cooling a laser is taught. In the illustrative embodiment, the inventive method includes the steps of providing a gain medium; pumping energy into a region of the gain medium; moving the medium; extracting energy from the region of the medium; and cooling region of the medium.

BRIEF DESCRIPTION OF THE DRAWINGS

FIG. 1 is a simplified representation of an illustrative offset pumping/extraction arrangement implemented in accordance with the present teachings.

FIG. 1a is a front view of the annular gain medium of the disk of FIG. 1 in accordance with an illustrative embodiment of the present teachings.

FIG. 1b is an isolated view of a single sector of the gain medium of FIG. 1a.

FIG. 1c is a magnified view of the single sector of FIG. 1b.

FIG. 2 is a front view showing an illustrative embodiment of the disk assembly of the present invention with an associated jet impingement cooling manifold.

FIG. 3 is an edge view of the disk assembly of the illustrative embodiment.

FIG. 4 shows a resonator architecture utilizing multiple counter-rotating annular gain media in accordance with an illustrative embodiment of the present teachings.

in accordance with the present teachings.

Figure 6:
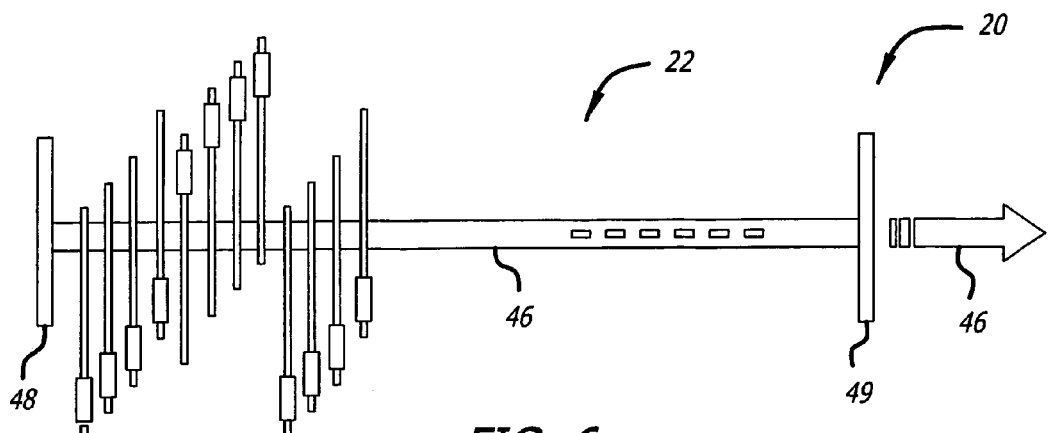
FIG. 6 is a simplified side view of the resonator of FIG. 4.
Figure 6A:
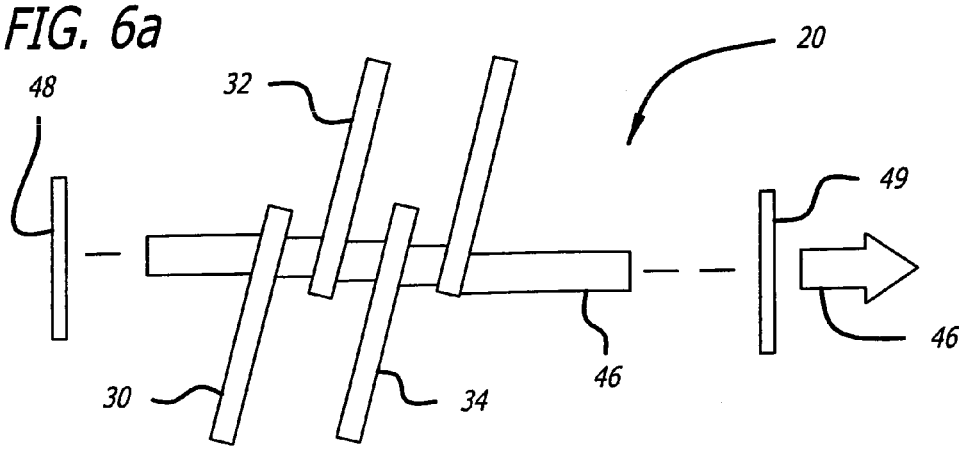
FIG. 6a is a diagram that shows an arrangement in which the gain media of the disks are disposed in a parallel relation tilted with respect to the incident beam at the Brewster angle, $$\theta_{Brewster} = \tan^{-1}\left(\frac{n_{gainmedium}}{n_{air}}\right),$$
Figure 6B:
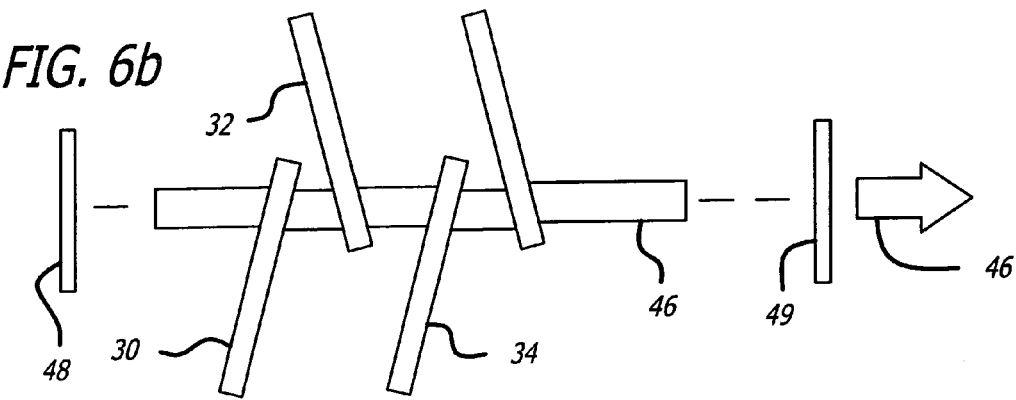

FIG. 6b is a diagram that shows an arrangement similar to that of FIG. 6a with the exception in that in FIG. 6b, the gain media of the disks are alternately tilted at the Brewster angle with respect to the incident beam.

Figure 6C:
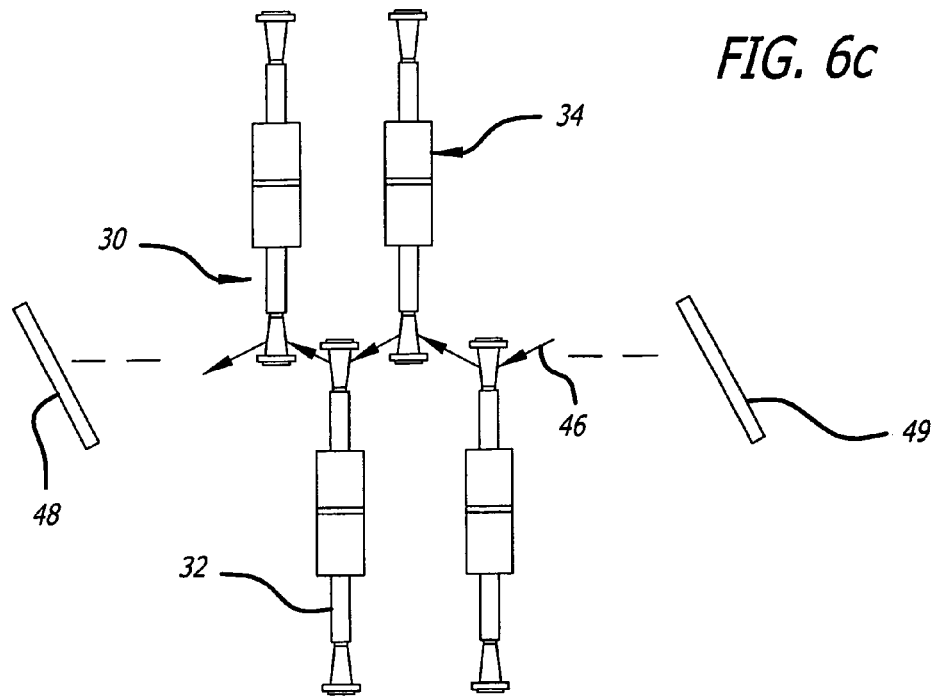

FIG. 6c is a diagram that shows an arrangement in which the disks are disposed in a parallel configuration, but comprise wedge geometry gain media with gain faces tilted at the Brewster angle with respect to the laser beam/optic axis.

Figure 7:
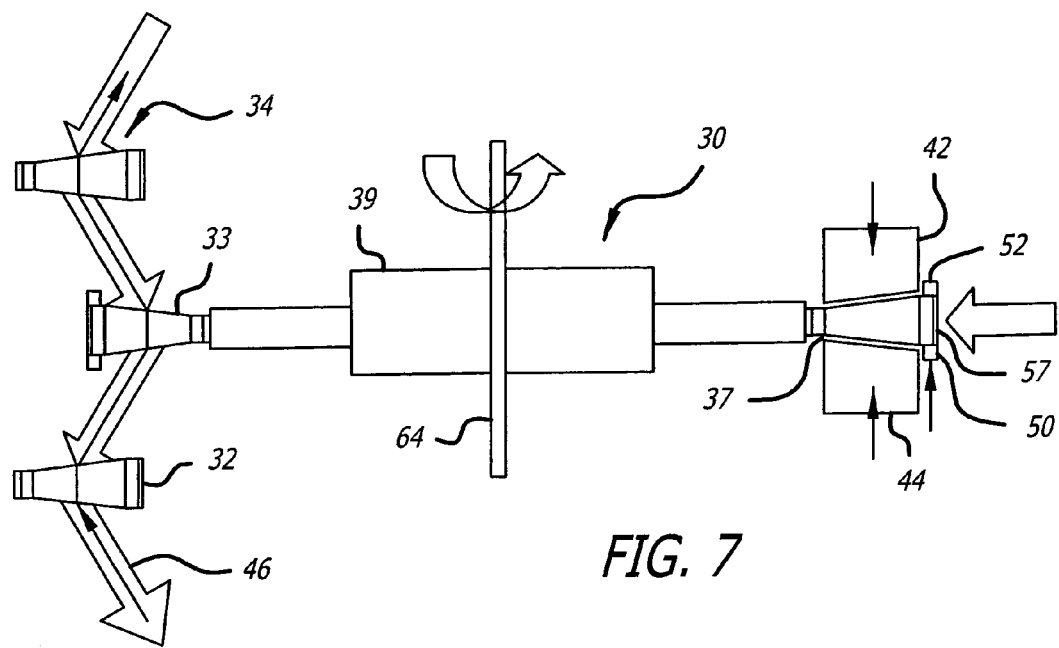

FIG. 7 shows a side view of an illustrative embodiment of the disk assembly of the present invention in an edge pumped mode of operation with a cooling manifold.

Figure 7A:
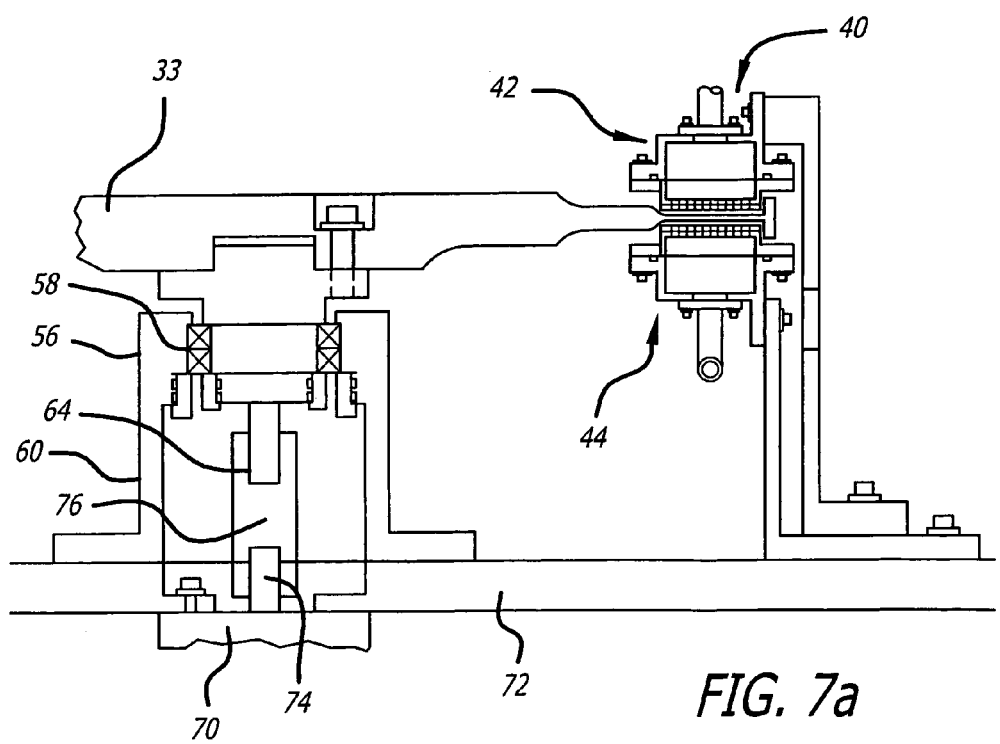

FIG. 7a is a schematic side view of a motorized disk drive in accordance with an illustrative embodiment of the present teachings.

Figure 7B:
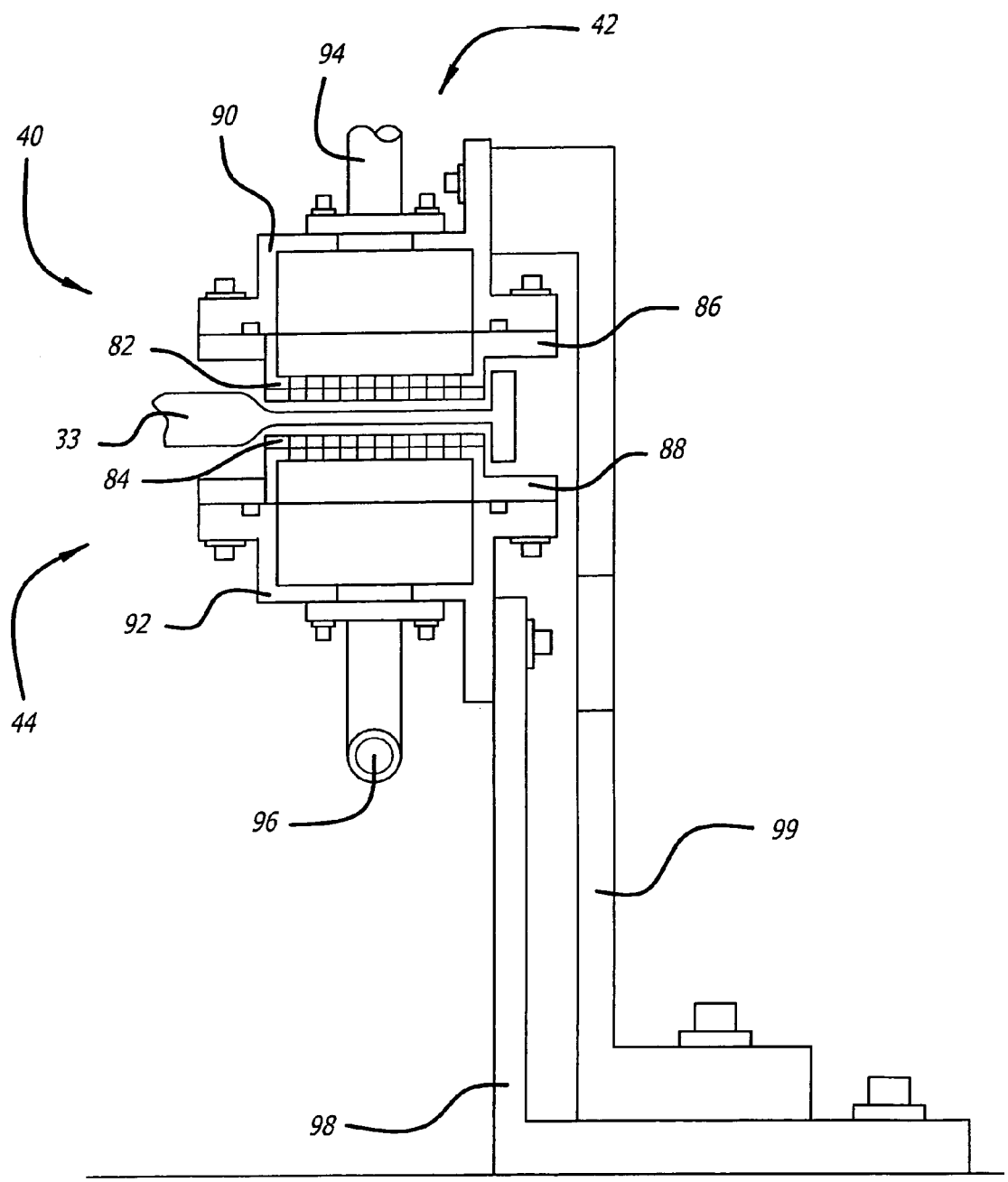

FIG. 7b is a magnified view of an illustrative embodiment of the cooling manifold in accordance with the present teachings.

Figure 8:
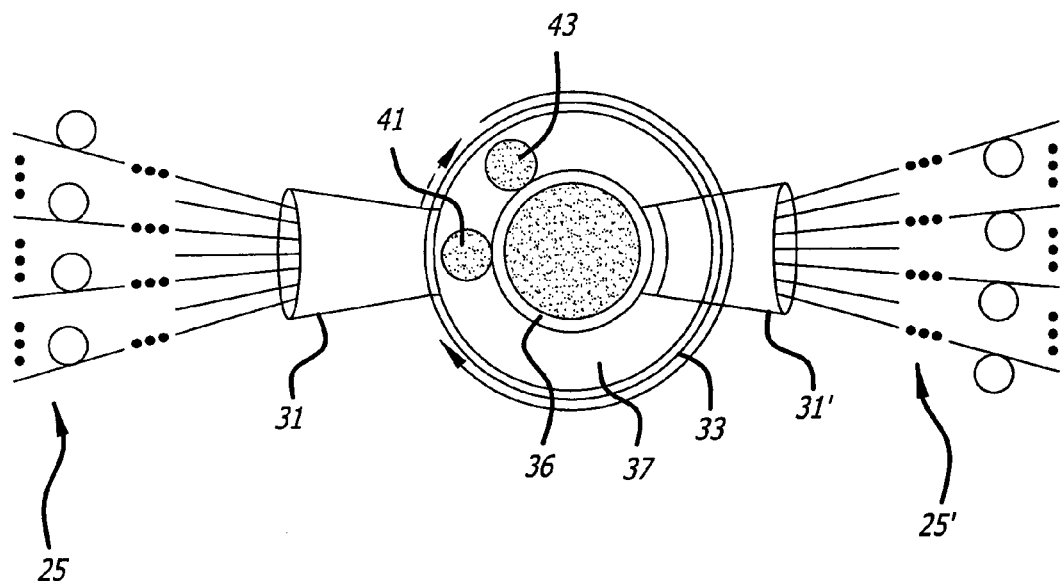

FIG. 8 is a simplified front view showing an arrangement for two-sided pumping of a disk implemented in accordance with an illustrative alternative embodiment of the present teachings.

Figure 9:
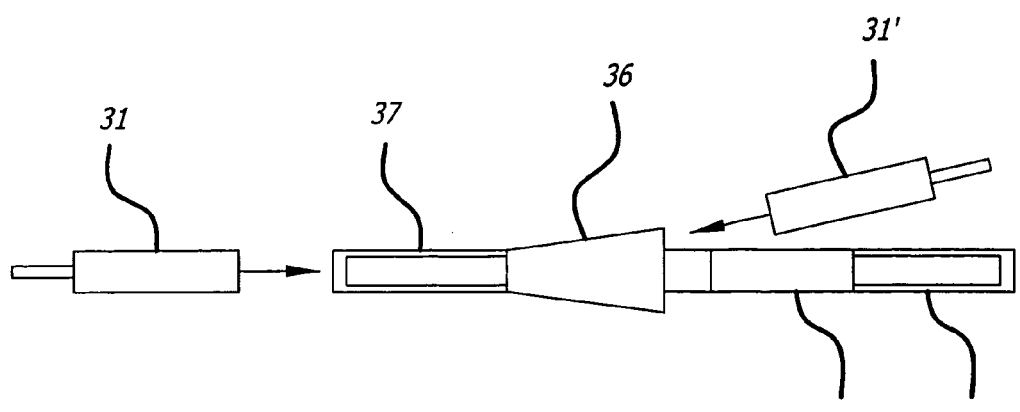

FIG. 9 is a simplified edge view of the arrangement of FIG. 8.

Figure 10:
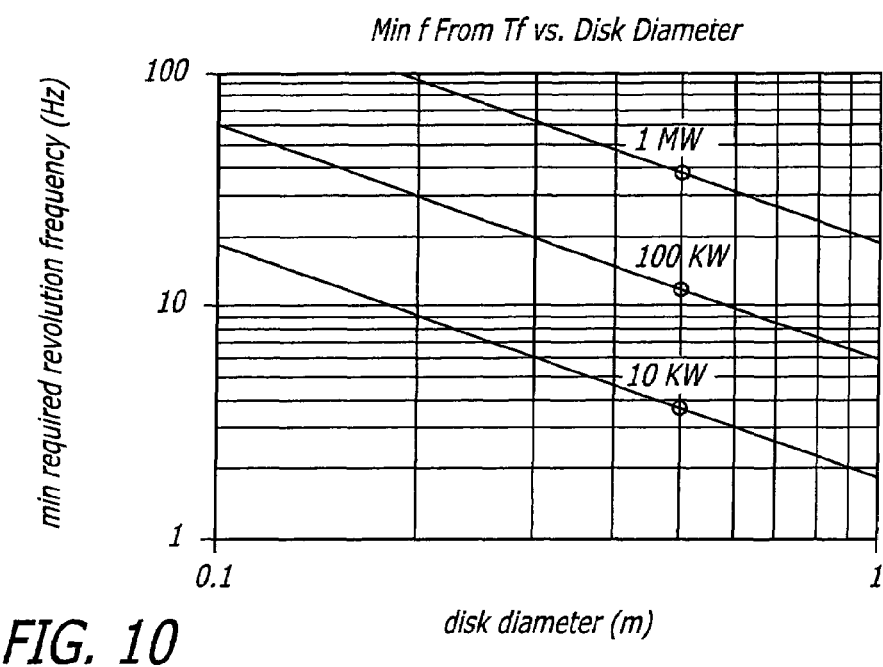

FIG. 10 is a graph showing rotation frequency dependence on the disk diameter.

Figure 11:
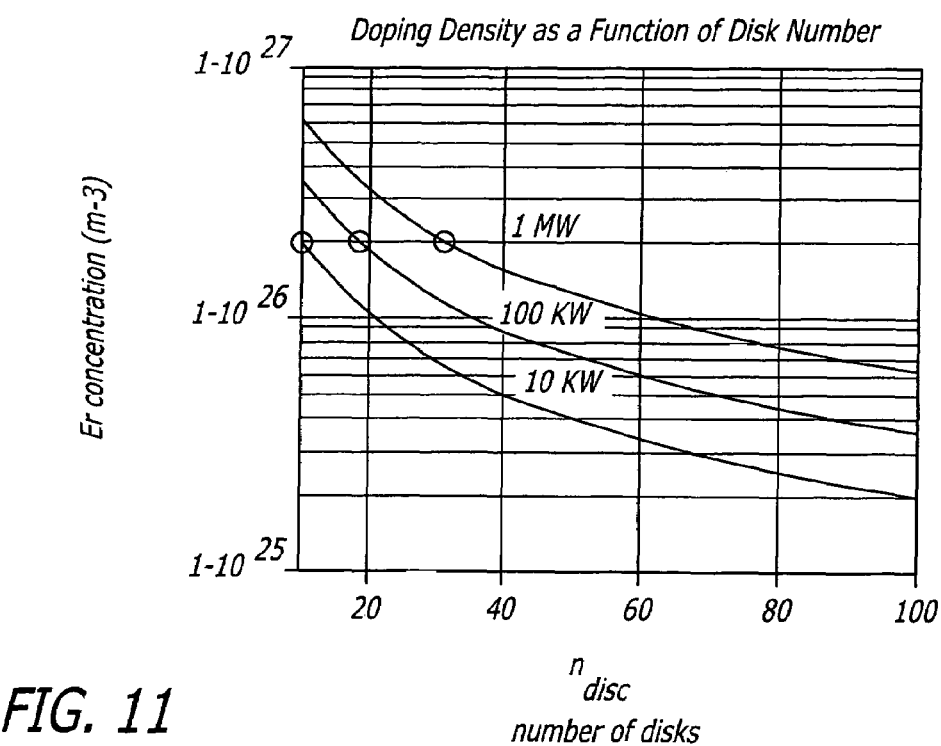

FIG. 11 is a diagram which shows the dependence of the number of required disk sub-assemblies as a function of doping density for the three different power categories.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a simplified representation of an illustrative offset pumping/extraction arrangement implemented in accordance with the present teachings. As discussed more fully, the arrangement 10 includes a source of pump energy 13, 15 and 17; an annular gain medium 37; and an arrangement 11 for concentrating energy from the source on the gain medium. In the illustrative embodiment, pump energy is provided by a plurality of diode arrays of which three are shown 13, 15 and 17. Each array includes plural laser diodes of which three are shown 19, 21 and 23 with respect to the first array 13. Diode arrays are well-known in the art and may currently be purchased from such vendors as Quintessence of Sylmar, Calif.; NP Photonics of Seattle, Wash.; or Coherent of Santa Clara, Calif. Nonetheless, those skilled in the art will appreciate that the invention is not limited to the manner by which pump energy is provided to the medium.

The arrangement 11 includes plural bundles 25, 27 and 29 of optical fibers. As illustrated in FIG. 1, pump energy from each diode in each array is coupled to an optical fiber, in a bundle 25, 27 or 29, at one end thereof and to a concentrator 31 at a second end thereof. In accordance with the present teachings, the concentrator 31 concentrates the energy from the optical fibers onto the gain medium 37 of a disk 33 of a disk assembly 30. In the illustrative embodiment, the gain medium 37 is disposed about a metallic hub 39 in an annular configuration.

FIG. 1a is a front view of the annular gain medium 37 of the disk 33 of FIG. 1 in accordance with an illustrative embodiment of the present teachings. FIG. 1b is an isolated view of a single sector of the gain medium 37 of FIG. 1a.

FIG. 1c is a magnified view of the single sector of FIG. 1b. As shown in FIGS. 1a-c, in the illustrative embodiment, the gain medium 37 is comprised of a plurality of individual facets or sectors of a polygon. FIG. 1c shows the detail of the gain medium annulus. HR inner disk coating 55 provides for dual pass absorption and undoped index matched edge coatings 51, 53 for robust damage resistance. Each sector includes a doped annular gain medium 38 sandwiched between rings of undoped material with appropriate index match (e.g. undoped YAG in the case of Er:YAG gain medium) 51 and 53. A coating 55, highly reflective at the pump wavelength, is disposed inside the inner ring 51 of undoped YAG and a broadband antireflective coating 57 is provided on the outer ring 53 of undoped YAG.

The facets of the polygon can all be polished with exclusively straight edge geometries for ease of fabrication. An index matching ceramic glaze (e.g. a glaze with an index matched to YAG) can be applied along the edges, before the final slab cutting, and polished to the objective design thickness. Subsequently, the facets are bonded together via an optical contact technique or a very thin ceramic glaze interface in order to provide for nearly seamless gain geometry. The outer edge should then undergo a "touch-up" smoothing polish in order to provide for an efficient robust optical pump coupling interface. The gain medium may be coated with an antireflection coating. Brewster angled geometry or facets may be used as well.

In accordance with the present teachings, energy from the concentrator 31 excites a pumped region 41 on the gain medium 37. The disk 33 is spun such that robust thermal management may be effected via: 1) the thin disk geometry and 2) a movement of the area exposed to deposited waste heat. As the disk 33 is spun, the pumped region is moved to position 43 at which the energy is extracted.

The inventive remote pumping implementation provides for a removed brightness requirement at the diode arrays. The diode arrays can be passively cooled fiber-optic pigtail packages that can then be joined in a branch type arrangement as shown in FIG. 1 in order to increase the brightness provided at the pump region 41.

FIG. 2 is a front view showing the disk assembly 30 with an associated jet impingement cooling manifold 45. In the best mode, the gain medium 37 is an annular erbium yttrium-aluminum-garnet (Er:YAG) structure. However, the present teachings are not limited to the shape or type of gain medium employed. Those of ordinary skill in the art will appreciate that other gain media or other shapes may be used without departing from the scope of the present teachings.

FIG. 3 is an edge view of the disk assembly 30 of the illustrative embodiment. As shown in FIG. 3, the jet impingement manifold 40 has two sets of ducts 42 and 44 disposed on opposite sides of the gain medium 37. The air ducts are pneumatically coupled to a forced air-cooling system (not shown) of conventional design and construction.

In accordance with the present teachings, the pumped region is spatially separated from the resonator/extraction region enabling a low distortion resonator extraction mode of operation. The multiplexing of the individual disk gain modules can be implemented such that the extraction gain profile dynamics is uniform. This accomplished by an offset axis disk multiplexing shown in FIG. 4.

Figure 5:
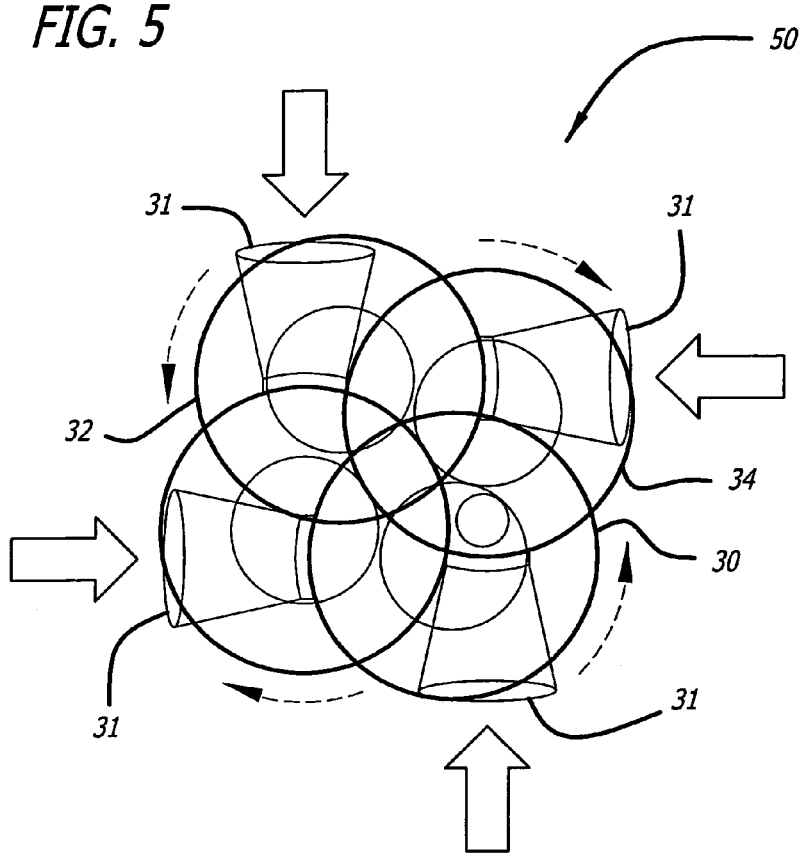
FIG. 5 is a simplified front view of the resonator of FIG. 4 with concentrators in accordance with the present teachings.

FIGS. 4-6 show a multiplexing of disk modules in a single laser cavity for most efficient power scaling. FIG. 4 shows a resonator architecture utilizing multiple counter-rotating annular gain media in accordance with an illustrative embodiment of the present teachings. As shown in FIG. 4, the resonator 20 includes plural disk assemblies implemented in accordance with the present teachings of which only three are shown 30, 32, and 34.

FIG. 5 is a simplified front view of the resonator of FIG. 4 with concentrators 31 in accordance with the present teachings.

FIG. 6 is a simplified side view of the resonator of FIG. 4. As shown in FIGS. 4-6*c*, in the illustrative embodiment, the disks are mounted in an offset (off-axis) orientation to enable the extraction zones thereof to be in optical alignment within a resonator region formed between a high reflection mirror 49 and an outcoupling mirror 48. When lasing occurs, a beam is created by mirrors 48 and 49 which passes through the extraction zones of the spinning disks.

The disks 33 are pumped continuously through the edge via free-space coupled light guide/concentrators 31. The excited volume of each disk 33 is then transported within the resonator cavity 22, where it spatially overlaps with the resonator mirrors 48 and 49 as well as with the other discs' excited annular regions. While the excited region of each disk is outside of this overlap resonator/cavity region, it will have insufficient gain for laser oscillation. However, once it enters the resonator cavity/overlap region, the resonator mirror feedback and the cumulative (additive) gain from the other, discs' excited annular volumes will result in laser oscillation with high extraction efficiency.

The offset axis disk module multiplexing with counter-rotating dynamics of the present invention provides for a uniform extraction mode profile. The adjustment of both angular velocity and offset disk axes positions can provide for dynamic tuning of the extraction mode profile to compensate for small phase distortions. This is illustrated in FIGS. 6*a*-6*c*. FIGS. 6*a*-*c* show various arrangements by which Brewster angles are used to mitigate the need for a high reflection coating on each sector of the gain media of the disks. Using Er:YAG as the gain medium as an example, the Brewster angle is:

$$\theta_{Brewster} = \tan^{-1}\left(\frac{n_{YAG}}{n_{air}}\right) = 61°. \quad [1]$$

FIG. 6*a* is a diagram that shows an arrangement in which the gain media of the disks are disposed in a parallel relation tilted at Brewster angle with respect to the incident beam 46.

FIG. 6*b* is a diagram that shows an arrangement similar to that of FIG. 6*a* with the exception in that in FIG. 6*b*, the gain media of the disks are alternately tilted at Brewster angle with respect to the incident beam 46.

FIG. 6*c* is a diagram that shows an arrangement in which the disks are disposed in a parallel configuration, but comprise wedge geometry gain media with gain faces tilted at Brewster angle with respect to the beam 46. In FIG. 6*c*, the gain media are constructed as shown in FIG. 1*c*.

The modular disk subassembly illustrated in FIGS. 4-6*c* allows for ready scaling to very high (e.g., megawatt-class) power levels.

Edge Pumping

Edge pumping can be implemented with a reflective inner radius 55 in order to reflect the pump energy in a double-pass arrangement. In this way, pump uniformity across the gain rim can be achieved. This is illustrated in FIGS. 7 and 8.

FIG. 7 is a simplified side view of an illustrative embodiment of the disk assembly of the present invention in an edge pumped mode of operation with a cooling manifold. In FIG. 7, rims 50 and 52 are used to stabilize the edge of the medium 37. As shown in FIG. 7, optical pump energy is supplied to the medium 37 of the disk 33 at the edge of the gain medium thereof via its broadband antireflection coating 57. While the disk is spun and edge pumped, the medium 37 is cooled by a gas via jet impingement structures 42 and 44 of the cooling manifold 40. Each disk is spun by a motor (not shown) via a shaft 64. An illustrative arrangement for spinning the disks is provided in FIG. 7*a*.

FIG. 7*a* is a schematic side view of a motorized disk drive in accordance with an illustrative embodiment of the present teachings. As shown in FIG. 7*a*, the inventive disks are spun by a conventional motorized drive with either conventional (steel ball) or air bearings. A bearing mounting is shown in FIG. 7*a*. The bearing mounting consists of a base and a precision bearing support 60 with a bearing 58 mounted inside a precision bore (not shown). A threaded bearing retainer 58 is used to secure an outer bearing 56 to the support. A bearing shaft 64 mounts to the inner bearing retainer and is clamped with a similar threaded bearing retainer 58. The rotating disk 33 is attached to the top of the bearing shaft 64. A DC motor 70 with an attached optical encoder (not shown) is mounted to a lower motor support plate 72. The motor 70 is attached to the plate 72 and a motor shaft 64 connects to the bearing shaft 64 via a coupler 76.

A mechanical bearing spindle 56 is included having a duplex pair ball bearing 58 mounted inside the bearing support 60. Such duplex pair bearings 58 have been used on airborne gimbals and precision laser pointing devices. The duplex pair bearing 58 reduces the axial and radial play in the shaft 64. This design places a controlled amount of compression from one bearing into the second bearing to remove the end play. This precision is needed to maintain, in the best mode, an air jet gap of 0.025 inches on both sides of the disk 33. The geometry of the bearing support and bearing fits are precision machined for operation over an extended temperature and vibration range.

In an illustrative implementation, the disks are spun at rates ranging from 1 Hz to 35 Hz—depending on the design performance power of the laser. In the best mode, the motor 70 rotates the disk 33 nominally at ~1200 RPM (20 Hz). The velocity is adjusted by changing the DC voltage applied to the motor. An optical encoder (not shown) may be used to provide the exact velocity.

FIG. 7*b* is a magnified view of an illustrative embodiment of the cooling manifold in accordance with the present teachings. In the illustrative embodiment, the cooling manifold 40 includes thin fused quartz plates 82, 84 with holes laser drilled in a very dense pattern. In the illustrative embodiment, the hole diameter is 0.010 inches with center to center spacing of about 0.050 inches.

In the illustrative embodiment, there are four separate jet panels 90 for the top of the disk 33 and four on the lower side of the disk 92. Each jet plate 82, 84 has a tube 42, 96 to bring the compressed air into a high pressure side of the jet plate 82, 84. The manifold 90, 92 will distribute the pressure evenly so each jet will have the same pressure. In the best mode, the manifolds 90, 92 are adjustable in both directions to establish the desired spacing of 0.025 inches from the disk 33. Preferably, both the upper and lower manifolds are adjustable. Each manifold 90, 92 has a supply line from a regulated air bottle (not shown) and are able to make pressure changes from the upper and lower manifolds 90, 92. The manifolds 90, 92 are bolted together with standard face seal O-rings.

The inventive arrangement allows for use of a conductively cooled pump source implementation due to a greatly reduced brightness requirement at the diode array. The offset pumping/extraction geometry of the present invention can be implemented in an optimized fashion in order to achieve:

i) optimized transit time between the pumping and extraction regions ($t \leq \frac{1}{5}^{th}\tau_F$, where $\tau_F$ is the fluorescence lifetime of the upper laser level);

ii) resonator cross-area transit time << thermal diffusion time constant enabling thermal distortion free extraction beam mode profile; and iii) residual round trip transit time back to the pump area >(~2×) thermal diffusion time constant.

Continuous cooling with laminar gas flow allows for phase distortion free cooling in a continuous wave operation for efficient laser operation. The pump uniformity is enhanced with either a dual pass reflection geometry or the implementation of two sided pumping as discussed more fully below.

Two-Sided Pumping

FIG. 8 is a simplified front view showing an arrangement for two-sided pumping of a disk implemented in accordance with an illustrative alternative embodiment of the present teachings.

FIG. 9 is a simplified edge view of the arrangement of FIG. 8. As shown in FIGS. 8 and 9, for each disk, a second bundle of optical fibers conveys pump energy via a second concentrator 31' to the pump region 41 of the gain medium 37 while pump energy is applied to the pump region 41 via the first bundle of optical fibers and the concentrator 31. As shown more clearly in the edge view of FIG. 9, dual sided pumping into a single region is effected via an anti-reflection coated wedge concentrator 36.

For most efficient operation, in the illustrative embodiment, the laser cross-sectional gain area diameter is designed for a high intra-cavity to saturation intensity ratio (>>10) for efficient energy extraction. In addition, the pump region 41 to resonator extraction region 43 transit time, $\tau_{P-R}$, satisfies both the condition $\tau_{P-R} < \frac{1}{5}^{th}\tau_F$ (where $\tau_F$ is the fluorescence lifetime of the upper laser level), and the revolution time, $\tau_{PRF} \sim 2 \times \tau_{thermal}$ (where $\tau_{thermal}$ is the thermal diffusion time constant for the YAG disk). Finally, the transit time across the gain area, or the extraction time, $\tau_{extraction}$ is $<<\tau_{thermal}$ to increase the likelihood that no thermal phase distortions will occur during the extraction time.

The first requirement of the illustrative high energy laser (HEL) implementation is that the pump to extraction region excursion time should be ~1/5th fluorescence time, $\tau_F$. Secondly, the excursion of the pumped (excited) region across the extraction/lasing mode diameter should be much shorter than the thermal diffusion time constant for the disk gain medium ($\tau_{resonator} << \tau_{THERMAL}$). This is to minimize thermal gradients and, therefore, phase distortions during the extraction time. A third requirement is that the revolution time of the pumped and extracted region back to the original starting point should be longer than the thermal diffusivity time constant of the gain medium.

The first condition can be written as:

$$f = \frac{10 L_R}{\pi D \tau_F} \quad [2]$$

where f is the revolution frequency, $L_R$ is the resonator dimension, D is the diameter of the rotating disk structure and $\tau_F$ is the fluorescence lifetime of the upper laser state. The thermal diffusion time constant for a slab architecture (across the thin dimension) is:

$$\tau_{THERMAL} = \frac{t_{disc}^2 \rho C}{10 k} \quad [3]$$

where $t_{disc}$ is the thickness of the gain slab, $\rho$ is the density, C is the specific heat, and k is the thermal conductivity of YAG. We can also express the optimum resonator dimension/diameter from the condition:

$$\frac{P_{out} \tau_{resonator}}{L_R^2} = \frac{P_{out} \tau_F}{10 L_R^2} = \chi \frac{h\upsilon}{\sigma_0}, \quad [4]$$

where $P_{out}$ is the output power, $h\upsilon$ is the photon energy, $\sigma_0$ is the stimulated emission cross-section and $\chi$ is the multiplication factor (the goal is to have the intra-cavity equivalent fluence be ~>5× saturation fluence). From this condition, we can express the resonator cross-section dimension as:

$$L_R = \sqrt{\frac{P_{out} \sigma_0 \tau_F}{10 \chi h\upsilon}}. \quad [5]$$

Combining the expression for $L_R$ with the expression for f and requiring that:

$$f = \frac{1}{2\tau_{THERMAL}} = \frac{5k}{t_{disc}^2 \rho C} \quad [6]$$

leads to an expression for the rotating disk structure diameter:

$$D = \frac{t_{disc}^2 \rho C}{5 \pi k} \sqrt{\frac{P_{out} \sigma_0 10}{\chi_F h\upsilon}}. \quad [7]$$

FIG. 10 is a graph showing rotation frequency dependence on the disk diameter.

The resonator dwell time is:

$$\tau_{resonator} = \frac{L_R}{\pi D f} = \frac{\tau_F}{10}, \quad [8]$$

and $$f = \frac{1}{2\tau_{THERMAL}}. \quad [9]$$

FIG. 10 shows illustrative revolution rates (frequencies) for nominal disk geometries as a function of power.

The number of disc subassemblies and the individual disk annular gain thickness will be determined by the cooling requirement and by the maximum practical active ion (Er) doping concentration in the YAG crystal host. In the illustrative embodiment, Er concentrations on the order of ~1.4% are used. For this regime, the number of discs employed in a megawatt-class laser is ~30 with resonator length of ~3 meters. This is illustrated in FIG. 11.

FIG. 11 is a diagram which shows the dependence of the number of required disk sub-assemblies as a function of doping density for the three different power categories (calculated from the maximum extractable power equation):

$$N_D = \frac{\chi}{\eta_{extraction} l_{disc} n_{disc} \sigma_0}, \quad [10]$$

where $n_{disc}$ is the number of disks and $\eta_{extraction}$ is the extraction efficiency (assumed to be 50%). The further assumption is that the intra cavity-to-saturation intensity ratio is ~6× (given a 65% out coupler reflectivity).

The OPEG concept/architecture provides for a traceable disc subassembly design with minimized modifications for implementing a wide range of laser power performance which makes for an attractive modular design-implementation approach.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An arrangement comprising:
a disk-shaped gain medium;
a diode array; and
means for concentrating energy from said diode array on said gain medium, said means for concentrating includes a first bundle of optical fibers and a first concentrator, wherein each of said optical fibers is coupled to a respective diode in said array at a first end thereof and said concentrator at a second end thereof whereby energy from said diode array is directed to a pumped region of said gain medium, said means for concentrating further including a second bundle of optical fibers coupled to a second concentrator.

2. The invention of claim 1 further including means for rotating said gain medium.

3. The invention of claim 1 wherein said second concentrator is disposed to direct energy to said pump region.

4. The invention of claim 1 further including a cooling manifold thermally coupled to said gain medium.

5. The invention of claim 1 further including means for air cooling said gain medium.

6. The invention of claim 1 wherein said gain medium is erbium YAG.

7. The invention of claim 6 wherein said medium is doped erbium YAG.

8. The invention of claim 1 wherein said means for concentrating includes means for edge pumping said medium.

9. The invention of claim 8 wherein said means for concentrating includes a first antireflection coating disposed on an edge of said medium.

10. The invention of claim 9 wherein said edge is an outer edge.

11. The invention of claim 10 further including a second antireflection coating disposed on an inner edge of said medium.

12. The invention of claim 11 wherein said gain medium is erbium YAG.

13. The invention of claim 12 wherein said medium is doped erbium YAG.

14. The invention of claim 13 further including a first ring of undoped YAG disposed between said first coating and said doped medium.

15. The invention of claim 13 including a first ring of ceramic glaze disposed between said first coating and said doped medium.

16. The invention of claim 14 further including a second ring of undoped YAG disposed between said second coating and said doped medium.

* * * * *